United States Patent
Fukatsu et al.

(10) Patent No.: US 10,239,458 B2
(45) Date of Patent: Mar. 26, 2019

(54) TOWING VEHICLE

(71) Applicant: KABUSHIKI KAISHA TOYOTA JIDOSHOKKI, Aichi-ken (JP)

(72) Inventors: Fumihiro Fukatsu, Aichi-ken (JP); Hiroki Mori, Aichi-ken (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 10 days.

(21) Appl. No.: 15/490,168

(22) Filed: Apr. 18, 2017

(65) Prior Publication Data

US 2017/0313254 A1    Nov. 2, 2017

(30) Foreign Application Priority Data

Apr. 28, 2016    (JP) .................................. 2016-091339

(51) Int. Cl.
   *B60R 3/00*     (2006.01)
   *B62D 25/20*    (2006.01)
   *B62D 49/00*    (2006.01)

(52) U.S. Cl.
   CPC ............... *B60R 3/00* (2013.01); *B62D 25/20* (2013.01); *B62D 49/00* (2013.01)

(58) Field of Classification Search
   CPC ............ B60R 3/00; B62D 25/20; B62D 49/00
   USPC ..................... 280/163, 164.1, 400
   See application file for complete search history.

(56) References Cited

U.S. PATENT DOCUMENTS

| | | | | |
|---|---|---|---|---|
| 4,750,752 A * | 6/1988 | Furuta | ................. | B66F 9/07527 220/724 |
| 6,702,329 B1 * | 3/2004 | Nishio | ...................... | B60R 3/00 280/163 |
| 8,919,474 B2 * | 12/2014 | Masuda | .................. | B60R 3/005 180/89.1 |
| 2008/0277179 A1 | 11/2008 | Elsesser | | |
| 2014/0097591 A1 * | 4/2014 | Fujimoto | .................. | B60R 3/00 280/164.1 |
| 2015/0083515 A1 * | 3/2015 | Tani | ....................... | B62D 49/00 180/346 |

(Continued)

FOREIGN PATENT DOCUMENTS

DE   10 2006 020 940    11/2007
EP        0 227 962     7/1987

(Continued)

OTHER PUBLICATIONS

Extended European Search Report issued in EP Appl. No. 17 16 6793.4 dated Sep. 14, 2017.

*Primary Examiner* — Jacob D Knutson
(74) *Attorney, Agent, or Firm* — Greenblum & Bernstein, P.L.C.

(57) ABSTRACT

A towing vehicle includes a vehicle body, a coupling device, a floor board, and a step. The coupling device is disposed at a rear portion of the vehicle body to connect a towing object to the vehicle body. The floor board is disposed in the vehicle body. The step is disposed in the vehicle body at a position lower than the floor board to form a level difference between the step and the floor board. The step includes an upper surface and a plurality of sides that bounds the upper surface. The plurality of sides includes at a rear portion of the upper surface a rear side that extends rearward and outward from the floor board. The vehicle body includes a rear surface that extends upward from the rear side.

12 Claims, 3 Drawing Sheets

(56) References Cited

U.S. PATENT DOCUMENTS

2016/0096478 A1    4/2016  Reynolds et al.

FOREIGN PATENT DOCUMENTS

| EP | 0 936 178 | 8/1999 |
| JP | 5-199618 | 8/1993 |
| JP | 11-222390 | 8/1999 |
| WO | 2016/054117 | 4/2016 |

* cited by examiner

TOWING VEHICLE

BACKGROUND OF THE INVENTION

The present invention relates to a towing vehicle.

Japanese Unexamined Patent Application Publication No. H05-199618 discloses a towing vehicle for pulling a cart and the like. The towing vehicle includes a vehicle body, a floor board and a coupling device that is provided at the rear end portion of the vehicle body. Operator of the towing vehicle connects a towing object to the coupling device of the towing vehicle, and then drives the towing vehicle to pull the object. After towing the object to a predetermined place, the operator disconnects the object from the coupling device. Thus, the operator needs to walk back and forth between the floor board and the coupling device to connect and disconnect the towing object. He also needs to get on and off the floor board for each connection and disconnection of the towing object.

Japanese Unexamined Patent Application Publication No. H11-222390 discloses an industrial vehicle that facilitates operator's getting on and off the floor board of the vehicle. The industrial vehicle is stepped to have a step at a position lower than the floor board. The step assists the operator in and facilitates getting on and off the floor board.

Generally in a towing vehicle in which the coupling device is provided at the rear end portion of the vehicle body, the towing vehicle operator gets on and off the floor board from and toward the rear of the vehicle body more frequently than from and toward the front of the vehicle body. The present invention, which has been made in light of the above-described problem, is directed to providing a towing vehicle that facilitates operator's getting on and off the floor board from and toward the rear of the vehicle body.

SUMMARY OF THE INVENTION

In accordance with one aspect of the present invention, there is provided a towing vehicle includes a vehicle body, a coupling device, a floor board, and a step. The coupling device is disposed at a rear portion of the vehicle body to connect a towing object to the vehicle body. The floor board is disposed in the vehicle body. The step is disposed in the vehicle body at a position lower than the floor board to form a level difference between the step and the floor board. The step includes an upper surface and a plurality of sides that bounds the upper surface. The plurality of sides includes at a rear portion of the upper surface a rear side that extends rearward and outward from the floor board. The vehicle body includes a rear surface that extends upward from the rear side.

Other aspects and advantages of the invention will become apparent from the following description, taken in conjunction with the accompanying drawings, illustrating by way of example the principles of the invention.

DETAILED DESCRIPTION OF THE EMBODIMENTS

Figure 1:
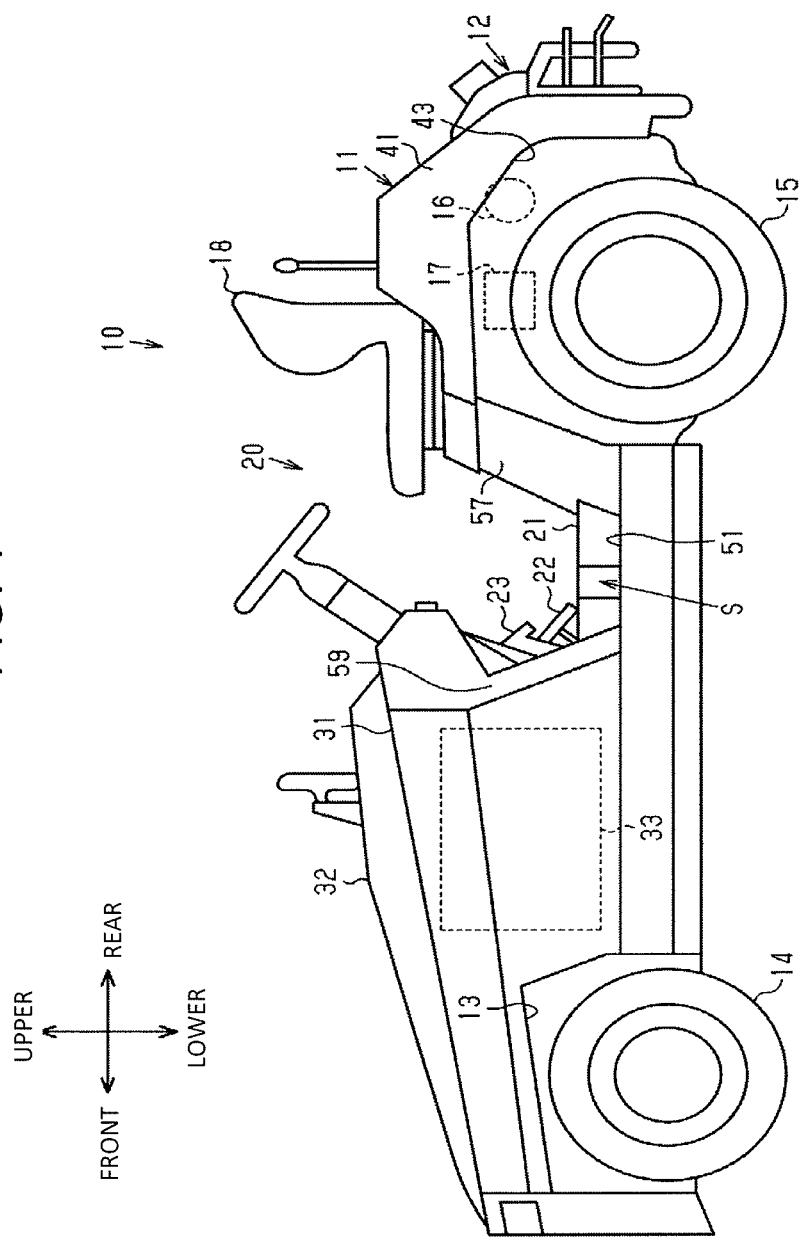
FIG. 1 is a schematic side view of a towing tractor according to an embodiment of the present invention.

The following will describe an embodiment of the present invention with reference to the accompanying drawings. Referring to FIG. 1, there is shown a towing tractor 10 as a towing vehicle. The towing tractor 10 includes a vehicle body 11 and a coupling device (or a draw bar) 12 at the rear end portion of the vehicle body 11 to connect a towing object to the vehicle body 11. The towing tractor 10 tows or pulls the towing object connected thereto through the coupling device 12. The towing object includes a loaded cart and the like. Directional notations appearing in the following description are associated with the vehicle body 11. Namely, front and rear, right and left and upper and lower represent the longitudinal direction, the width direction and the vertical direction of the vehicle body 11, respectively.

The vehicle body 11 includes a driver's section 20 and a battery housing 31 located forward of the driver's section 20. The battery housing 31 is covered with an openable battery hood 32. The battery housing 31 stores therein a battery 33.

The vehicle body 11 has on opposite sides at a front lower part thereof a pair of first wheel wells 13 in which a pair of front wheels 14 is disposed. The vehicle body 11 further includes a rear frame 41 behind the driver's section 20.

The rear frame 41 doubles as a counterweight. The rear frame 41 may be made by casting and forms a part of the vehicle body 11. The rear frame 41 has on opposite sides thereof a pair of second wheel wells 43 in which a pair of rear wheels 15 is disposed.

The rear frame 41 has a storage portion (not shown) between the second wheel wells 43. The storage portion stores therein a driving motor 16 and a control device 17. The driving motor 16 drives the rear wheels 15 as the driving wheels of the towing tractor 10, and the control device 17 controls the driving motor 16. The driving motor 16 is powered by the battery 33 to drive the rear wheels 15.

Figure 2:
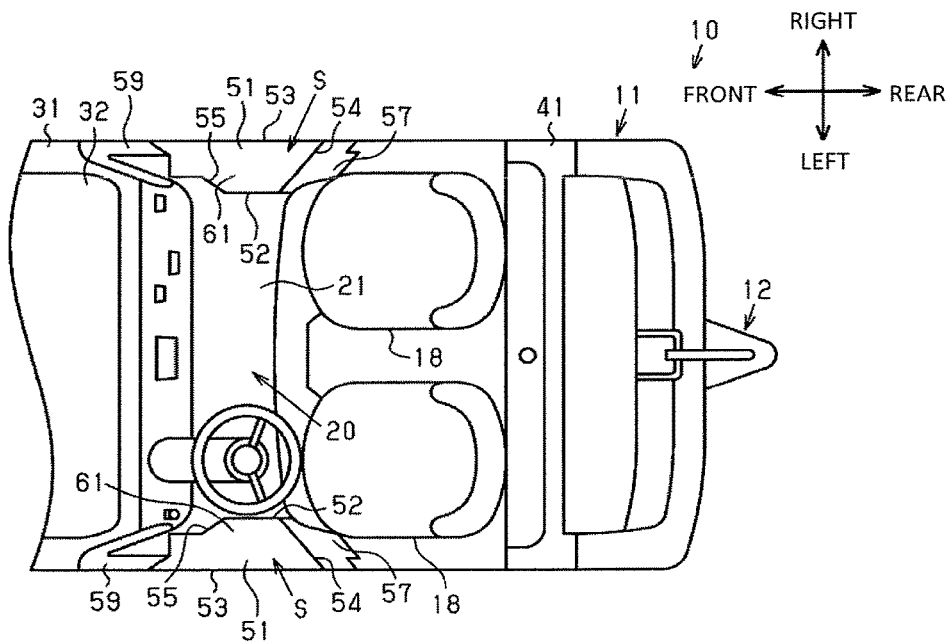
FIG. 2 is a fragmentary plan view of the towing tractor of FIG. 1.

As shown in FIGS. 1 and 2, two seats 18 are disposed side by side on the rear frame 41. The driver's section 20 has a floor board 21 located between the battery housing 31 and the rear frame 41. The driver's section 20 further has an accelerator pedal 22 and a brake pedal 23.

The vehicle body 11 is stepped to have a pair of steps 51 on opposite sides of the vehicle body 11. Each step 51 is disposed at a position lower than the floor board 21.

Figure 3:
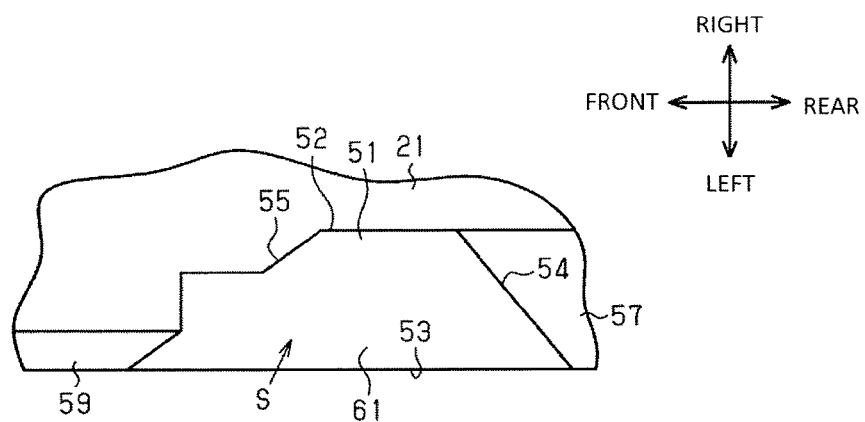
FIG. 3 is a schematic enlarged plan view of showing a step of the towing tractor of FIG. 1.

The following description will focus on the step 51 that is provided on the left side of the vehicle body 11. As shown in FIGS. 2 and 3, the step 51 is of an approximately trapezoidal shape in planar view. The step 51 includes an upper surface 61 and four sides 52, 53, 54, 55 that bound the upper surface 61. For the sake of the description, the side 52 will be referred to as the first side and the side 53 as the second side, respectively. The side 54 will be referred to as the rear side and the side 55 as the front side, respectively. As shown clearly in FIG. 3, the step 51 is configured so that the first side 52 and the second side 53 are opposite to each other and the first side 52 is shorter than the second side 53. Additionally, the upper surface 61 of the step 51 is contiguous at the first side 52 thereof with the vertical wall of the floor board 21, and the second side 53 of the step 51 is located outward of the first side 52 in the width direction.

The rear side 54 forms the rear side of the upper surface 61 of the step 51 and connects one end of the first side 52 and one end of the second side 53. The front side 55 forms the front side of the upper surface 61 of the step 51 and connects the other end of the first side 52 and the other end of the second side 53. The rear side 54 is located behind the front side 55.

The rear side 54 of the upper surface 61 extends obliquely rearward and outward from the floor board 21. The front side 55 of the upper surface 61 extends frontward and outward from the floor board 21. The first side 52 extends in longitudinal direction of the vehicle body 11 and serves as a connecting side that connects the rear side 54 and the front side 55 at the ends thereof adjacent to the floor board 21.

Figure 4:
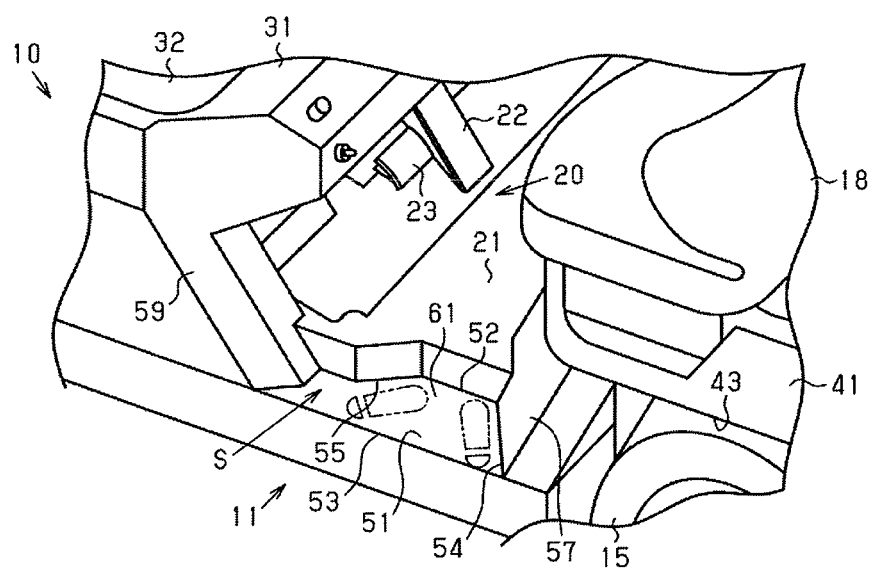
FIG. 4 is a fragmentary perspective view of showing the step of FIG. 3.

As shown in FIG. 4, the vehicle body 11 has a rear surface 57 that extends upward from the rear side 54, so that the rear side 54 serves as borderline between the rear surface 57 and the step 51. The rear surface 57 is tilted rearward. The tilted rear surface 57 which forms a part of the rear frame 41 in which the second wheel well 43 is formed provides a retracted corner at the entry to the driver's section 20.

The vehicle body 11 has a front surface 59 that extends upward from a part of the front side 55, so that the front side 55 serves as borderline between the front surface 59 and the step 51. The front surface 59 is tilted frontward. The tilted front surface 59 which forms a part of the battery housing 31 provides a retracted corner at the entry to the driver's section 20.

The following will describe the function of the towing tractor 10 according to the present embodiment.

The step 51 and the space over the step 51 form an entrance S to the floor board 21. The step 51 in which the rear side 54 extends obliquely rearward and outward from the floor board 21 expands the area of the entrance S in the longitudinal direction. In this case, the entrance S has a wide gate as compared with the case that the rear side 54 extends from the first side 52 linearly in the width direction, namely perpendicularly.

The above embodiment offers the following effects.

(1) The provision of the rear side 54 in the step 51 widens the entrance S which allows the operator to get on the floor board 21 diagonally through the rear portion of the step 51 from the rear of the vehicle body 11 without moving to a position just beside the step 51 and also to get off the floor board 21 diagonally through the rear portion of the step 51 toward the rear of the vehicle body 11. Therefore, the towing tractor 10 according to the present embodiment facilitates operator's getting on and off the floor board 21 of the towing tractor 10 from and toward the rear of the vehicle body 11.

(2) In the towing tractor 10 in which the rear surface 57 is tilted rearward, the operator is allowed to get on the floor board 21 smoothly and diagonally from the rear of the vehicle body 11 without contacting the rear surface 57 and also to get off the floor board 21 smoothly and diagonally toward the rear of the vehicle body 11 without contacting the rear surface 57. The rear surface 57 does not prevent operator's smooth movement. Therefore, the towing tractor 10 according to the present embodiment further facilitates operator's getting on and off the floor board 21 of the towing tractor 10 from and toward the rear of the vehicle body 11.

(3) In the battery-powered towing tractor 10, the battery 33 is stored at a position in the vehicle body 11 that is frontward of the floor board 21, so that operator's getting on and off the towing tractor 10 for maintenance of the battery 33 should preferably be facilitated. According to the present embodiment in which the step 51 of the towing tractor 10 has the front side 55 that extends frontward and outward from the floor board 21, the gate of the entrance S to the floor board 21 is further widened, which allows the operator to get on the floor board 21 diagonally through the front portion of the step 51 from the front of the vehicle body 11 without moving to a position just beside the step 51 and also to get off the floor board 21 diagonally through the front portion of the step 51 toward the front of the vehicle body 11 without moving to a position just beside the step 51. Therefore, the towing tractor 10 according to the present embodiment facilitates operator's getting on and off the floor board 21 from and toward the front of the vehicle body 11.

(4) In the present embodiment in which the front surface 59 is tilted frontward, the operator is allowed to get on the floor board 21 smoothly and diagonally from the front of the vehicle body 11 without contacting the front surface 59 and also to get off the floor board 21 smoothly and diagonally toward the front of the vehicle body 11 without contacting the front surface 59. The front surface 59 does not prevent operator's smooth movement. Therefore, the towing tractor 10 according to the present embodiment further facilitates operator's getting on and off the floor board 21 from and toward the front of the vehicle body 11.

(5) If the upper surface 61 of the step 51 is formed bounded by the rear side 54, the front side 55, and the second side 53 only, the area of the step 51 may be expanded to the point where the extensions of the rear side 54 and the front side 55 intersect each other. In such case, if the angles between the second side 53 and the rear side 54 and between the second side 53 and the front side 55 are same as the angles in the present embodiment of FIG. 3, however, the area of the floor board 21 is reduced as compared with the case that the first side 52 is provided as in the present embodiment. The provision of the first side 52 for the step 51 prevents the area of the floor board 21 from being reduced while facilitating operator's getting on and off the towing tractor 10.

The present embodiment may be modified variously as exemplified below.

Figure 5:
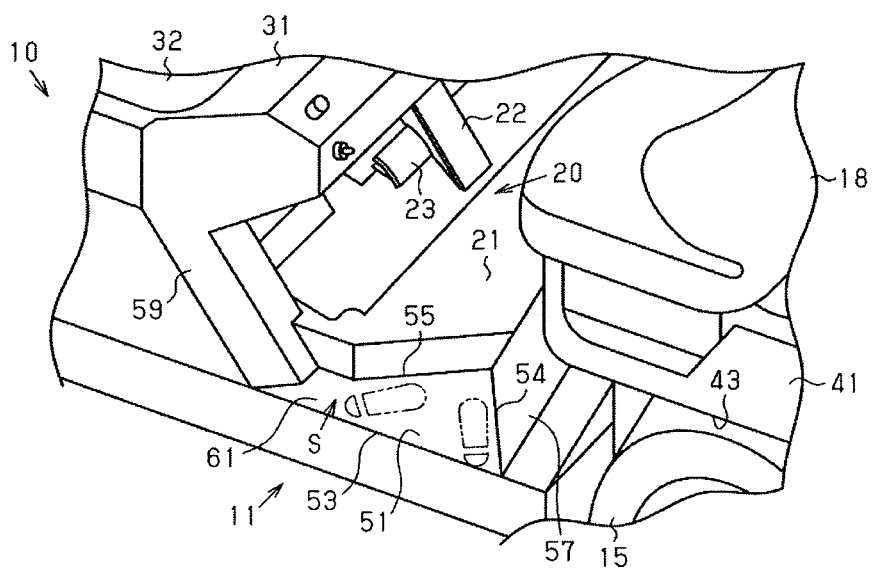
FIG. 5 is a fragmentary perspective view of showing a modification of the step.

As shown in FIG. 5, the step 51 may be provided in an approximately triangle shape in planar view. In other words, the upper surface 61 of the step 51 may be formed bounded by the rear side 54, the front side 55, and the second side 53 only. According to the present invention, the upper surface 61 of the step 51 may be of a polygonal shape other than a triangle shape.

The front surfaces 59 may extend vertically without tilting frontward.

The rear surfaces 57 may also extend vertically without tilting rearward.

The front side 55 of the step 51 need not necessarily extend frontward but it may extend linearly outward from the floor board 21.

The rear side 54 may extend obliquely rearward and outward from the floor board 21 only in either one of the steps 51 on opposite sides of the floor board 21.

The towing tractor 10 may be powered by an engine to drive driving wheels.

The towing vehicle may be any other tractor than the towing tractor 10 as long as the towing vehicle includes the coupling device 12 to connect a towing object to the towing vehicle.

The rear sides 54 may extend rearward and outward from the floor board 21 in a step-by-step manner.

The front sides 55 may extend frontward and outward from the floor board 21 in a step-by-step manner.

What is claimed is:

1. A towing vehicle comprising:
a vehicle body including a driver section;
a coupling device at a rear portion of the vehicle body to connect a towing object to the vehicle body;
a floor board disposed in the driver section of the vehicle body; and
a step disposed in the vehicle body at a position lower than the floor board to form a level difference between the step and the floor board, wherein
the step includes an upper surface and a plurality of sides that bounds the upper surface,
the plurality of sides includes at a rear portion of the upper surface a rear side that extends rearward and outward from the floor board,
the vehicle body includes a rear surface that extends upward from the rear side,
the vehicle body further includes a battery housing located forward of the driver section, the battery housing storing therein a battery,
the plurality of sides further includes, at a front portion of the upper surface, a front side that extends frontward and outward from the floor board, and
the vehicle body further includes a front surface that extends upward from the front side.

2. The towing vehicle according to claim 1, wherein the rear surface is tilted rearward from the rear side.

3. The towing vehicle according to claim 1, wherein the front surface is tilted frontward from the front side.

4. The towing vehicle according to claim 1, wherein the plurality of sides includes a connecting side that extends in a longitudinal direction of the vehicle body and connects the rear side and the front side at ends of the rear side and the front side adjacent to the floor board.

5. The towing vehicle according to claim 1, wherein the step is provided in an approximately triangle shape in a planar view.

6. The towing vehicle according to claim 1, wherein
the plurality of sides further includes a first side and a second side,
the first side extends in a longitudinal direction of the vehicle body and connects the rear side and the front side at first ends of the rear side and the front side adjacent to the floor board, and
the second side extends in the longitudinal direction of the vehicle body and connects the rear side and the front side at second ends of the rear side and the front side adjacent an entry to the driver section.

7. The towing vehicle according to claim 6, wherein the first side is shorter than the second side.

8. The towing vehicle according to claim 1, wherein the step includes an approximately trapezoidal shape in a planar view.

9. The towing vehicle according to claim 1, wherein the front surface forms a part of the battery housing.

10. The towing vehicle according to claim 1, wherein the front surface provides a retracted corner at an entry to the driver section.

11. The towing vehicle according to claim 1, wherein the front surface extends vertically without tilting frontward.

12. The towing vehicle according to claim 1, wherein the rear surface extends vertically without tilting rearward.

* * * * *